Patented Aug. 3, 1937

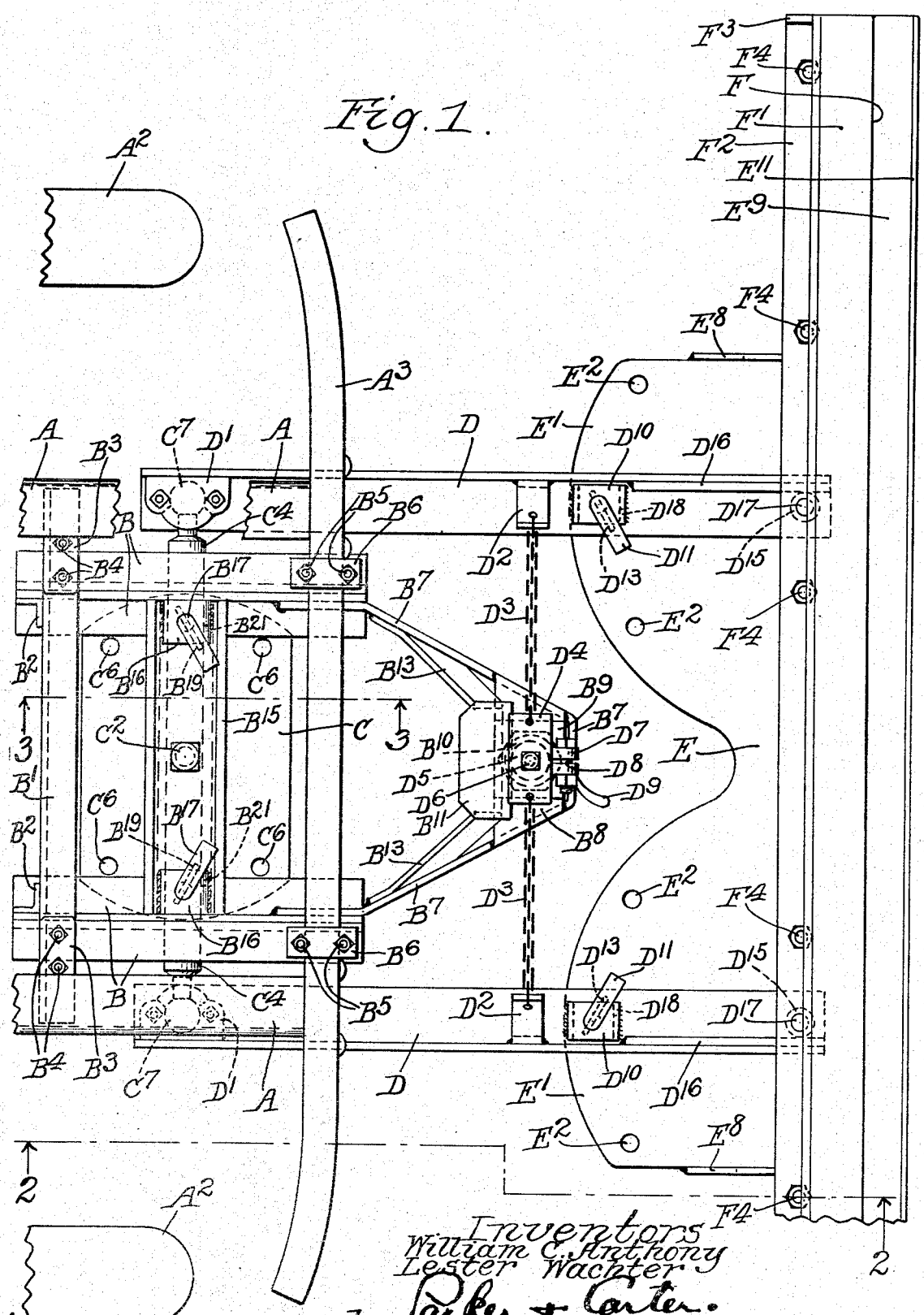

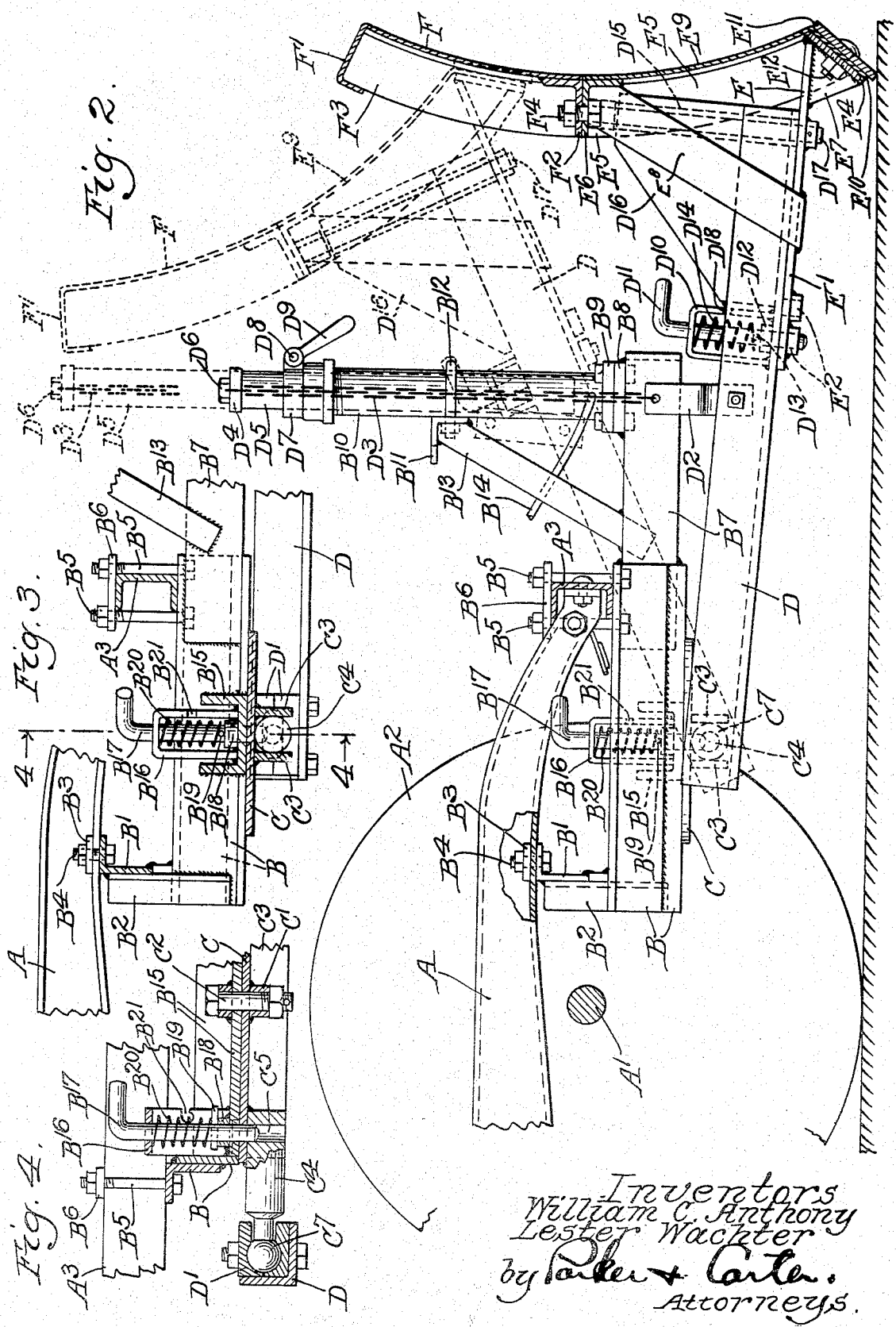

2,088,564

UNITED STATES PATENT OFFICE 2,088,564

ROAD IMPLEMENT

William C. Anthony and Lester Wachter, Streator, Ill., assignors to Anthony Company, Streator, Ill., a corporation of Illinois Application January 25, 1934, Serial No. 708,274

18 Claims. (Cl. 37—144)

This invention relates to a road implement. It has for one object to provide a scraper which may be detachably mounted upon an automobile or an automobile truck or on a vehicle of any desired sort. In the form here shown it is mounted upon a motor truck.

Another object is to provide a road implement adjustably positioned upon a vehicle. A further object is to provide a mounting for such an implement so arranged that the implement itself may be positioned at different angles with respect to the direction of movement of the vehicle and so that it may be raised and lowered and retained parallel to the ground, irrespective of its position of angular adjustment.

Other objects will appear from time to time in the specification and claims.

The invention is illustrated more or less diagrammatically in the accompanying drawings, wherein:—

Figure 1 is a plan view of a portion of a vehicle with the implement in position with certain parts broken away and certain parts omitted;

Figure 2 is a longitudinal vertical section, taken at line 2—2 of Figure 1;

Figure 3 is a longitudinal vertical sectional detail taken at line 3—3 of Figure 1;

Figure 4 is a transverse vertical sectional detail taken at line 4—4 of Figure 3;

Like parts are designated by like characters throughout the specification and drawings.

Figure 5:
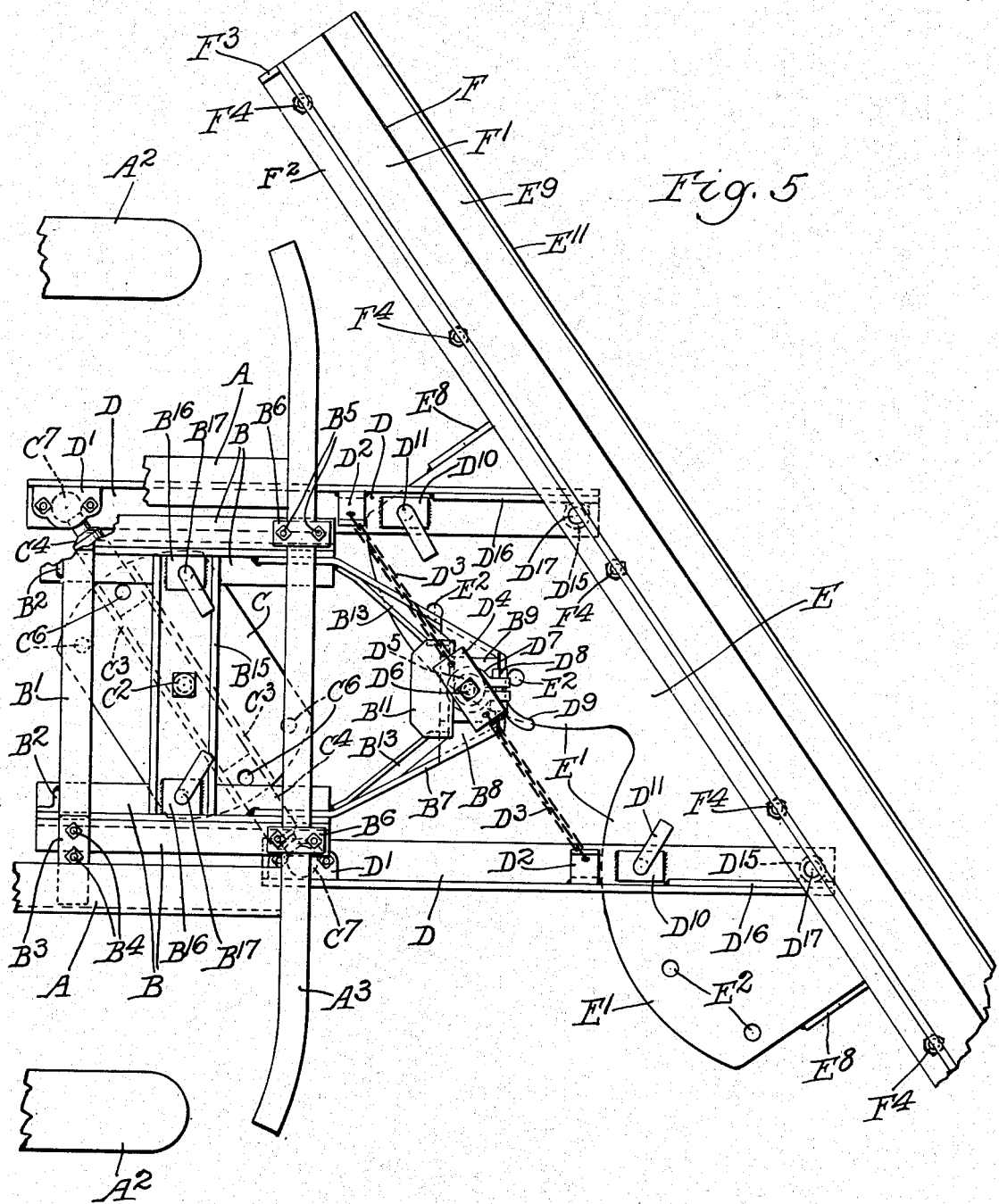
Figure 5 is a plan view generally similar to that shown in Figure 1, with parts omitted and parts broken away, showing the implement at a different position of adjustment from that shown in Figure 1.

The details of the vehicle upon which the implement and its supporting frame are mounted form no essential part of the present invention and a vehicle and frame of any sort might be used.

The frame, as illustrated diagrammatically herewith, comprises side members A, A. $A^1$ is an axle upon which the frame may be mounted in any desired manner. $A^2$ are wheels. A bumper or other cross member $A^3$ is attached to the front of the frame.

The implement assembly includes a sub-frame which is fixed upon the vehicle frame. It may be mounted thereon removably but in the operation of the device, it is not movable with respect to the frame and it furnishes, therefore, a relatively fixed base for the support and adjustment of the implement itself. The sub-frame includes a pair of preferably parallel side members B, B which may be of any suitable section. The side frame member B may be made of a unit or may be built up, as shown particularly in Figure 4. At their rear ends the side members B are attached to a cross member $B^1$ by means of upright members $B^2$ and the cross member $B^1$ is supported preferably upon the lower flange of the frame members A by means of a member $B^3$ which fits over this flange and is fastened to the cross member $B^1$ by bolts $B^4$. Adjacent their forward ends the side frame members B are supported from the vehicle frame cross member $A^3$ by bolts $B^5$ which engage a strap $B^6$ which rests upon the upper surface of the vehicle frame cross member $A^3$. Fastened to the forward end of the sub-frame is a generally pointed member $B^7$. As shown, it comprises a single unitary strap-like member. It might, of course, be made in any other way. Adjacent its forward end is positioned a base plate $B^8$. Upon this base plate $B^8$ is screwed, bolted, or otherwise fastened, the base $B^9$ of an hydraulic or other pressure cylinder $B^{10}$. Intermediate its ends the cylinder $B^{10}$ is in contact with an angle or plate $B^{11}$ to which it is held by a U-bolt $B^{12}$ which is fastened to one flange of the plate or angle $B^{11}$. Extending downwardly and rearwardly from the plate $B^{11}$ is a pair of braces $B^{13}$ which, at their upper ends, are attached to the plate or angle $B^{11}$ and at their lower ends are attached to the member $B^7$. A tube or conduit $B^{14}$ serves to supply fluid under pressure to the pressure cylinder $B^{10}$. It may be connected with any suitable source of pressure. Extending transversely across between the side frame members B, B of the sub-frame, is a supporting member $B^{15}$. It is preferably of channel section but may be of any section and it serves not as a frame member primarily but as a means for supporting the movable portion of the implement-carrying frame. Positioned adjacent the ends of the supporting frame member $B^{15}$ is a pair of stirrups $B^{16}$. The stirrups are perforated adjacent their tops to receive latch pins $B^{17}$ which slide through the perforations in the member $B^{16}$ and through corresponding perforations in the member $B^{15}$. A bearing and guiding member $B^{18}$ may be attached to the frame member $B^{15}$ to provide a better bearing for the pin $B^{17}$. A stop $B^{19}$ extends through each of the pins $B^{17}$ and a compression spring $B^{20}$ is positioned about each of the pins $B^{17}$ and forces each pin downward to the limit controlled by the stop pin $B^{19}$, so that the latter is normally in contact with the member $B^{18}$ and the pin is thus normally held down in its lowermost position. A notch $B^{21}$ in the side of the stirrup $B^{16}$ receives the pin $B^{19}$ and holds the latch pin up out of engagement with the plate C.

Pivotally supported beneath the cross member $B^{15}$ is a plate C. It may carry a bearing member $C^1$ and it is pivoted about a bolt or pin $C^2$ which extends through a perforation in the member $B^{15}$. Thus the plate is supported beneath the member $B^{15}$ for pivotal movement about the center of the pin $C^2$. The plate C may be shaped on its under side to provide a channel or it may have plate members welded or otherwise fastened to it. In the form here shown two members $C^3$, $C^3$ are fastened to the bottom of the plate C and furnish a support for short rods $C^4$, the plate C, the members $C^3$, and the short rods $C^4$, comprising a yoke structure mounted for pivotal movement about the axis of the pin $C^2$. These rods are perforated as at $C^5$ and the plate C is itself perforated above the rods so that the latch pins $B^{17}$ when free to do so, may extend through the perforation in the plate C and into the perforation $C^5$ as shown in detail in Figure 4. The plate itself is provided with other perforations $C^6$. There may be any suitable number of perforations $C^6$, the arrangement being such that when the plate is rotated from the position shown in Figure 1 to the position shown for example in Figure 5, the latch pins will penetrate into the perforations $C^6$ and hold the plate in that position. The number of such perforations depends upon the various desired positions of adjustment and any suitable number and arrangement of perforations may be adopted. At their outer ends the rods $C^4$ are preferably reduced in size and provided with ball members $C^7$.

To support the blade or other implement or tool, there is provided a pair of forwardly extending arms D, D. These may be, as shown, of angular cross section, or of any other desired shape. Each is provided preferably adjacent its rear end with a socket $D^1$ which engages one of the balls $C^7$ so that the arms D are supported through the rods $C^4$ and the balls $C^7$ in a ball and socket arrangement from the plate C and pivotal movement of the plate will move one arm backward and the other forward, as shown for example in Figure 5. Intermediate its ends and opposite the pressure cylinder $B^{10}$, each of the arms D is provided with an upwardly extending perforate member $D^2$, to which is fastened one end of a chain $D^3$. At its upper end each of the chains $D^3$ is fastened to a plate member $D^4$ which rests upon and is preferably attached to the upper end of a piston $D^5$ which is forced out of the pressure cylinder by the pressure within it. The plate $D^4$ is preferably pivotally mounted for swinging movement upon a pin $D^6$. Thus it can swing and accommodate itself to the adjustment of the blade or other implement as shown in Figure 5. A split ring or compression collar $D^7$ is mounted about the piston and is provided with a locking screw $D^8$ and a handle $D^9$ by means of which the collar may be locked about the piston to prevent its being lowered below the desired height. The collar might be dispensed with but when it is used it makes it unnecessary to retain pressure in the cylinder. Once the piston has been raised to the desired height, the collar being locked prevents lowering of the piston and so holds the parts at the desired position without the necessity of maintaining pressure within the cylinder. Intermediate its ends each of the arms D is provided with a stirrup $D^{10}$ within which a latch pin $D^{11}$ is journaled. The pin is arranged to protrude below the bottom of the arm D and may be additionally supported in a bearing member $D^{12}$ fastened to the member D. A limit pin $D^{13}$ limits the outward or downward movement of the latch pin and a compression spring $D^{14}$ forces the pin downward when it is free to do so. When the latch pin is raised the limit pin $D^{13}$ may be engaged in a notch $D^{16}$ in the stirrup $D^{10}$ to hold it in raised position. At its forward end each of the arms D is provided with a generally upstanding bearing sleeve $D^{15}$ for a pivot pin $D^{17}$. $D^{16}$, $D^{16}$ are reinforcing webs attached to the sleeves $D^{15}$ and to the arms D.

E is a blade or implement-carrying plate. As shown it includes two generally rounded, rearwardly extending portions $E^1$, $E^1$ each of which is provided with a plurality of perforations $E^2$, $E^2$. These perforations are preferably positioned in the arc of circles which have their centers at the pivots $D^{17}$, $D^{17}$. Fastened to the plate adjacent its forward edge which is preferably straight, is a frame member $E^4$. One or more generally vertically extending frame members $E^5$ are provided at or near the ends of the horizontal frame member $E^4$. An upper horizontal frame member $E^6$ joins the side members $E^5$. Angular members $E^7$ may be used to join the member $E^4$ with the plate E. One or more bracing strap members $E^8$ is provided to connect the plate E with the frame structure just described and particularly to connect it to the upper frame member $E^6$. $E^9$ is the board portion of a scraper. As shown, it is provided with a rearwardly bent lower portion $E^{10}$ which is in contact with the lower horizontal frame member $E^4$. $E^{11}$ is a road contacting blade which is detachably mounted by a series of bolts $E^{12}$. It may be of any desired shape and size and is preferably made detachable so that it may be removed after wear. The blade serves additionally to hold the lower edge $E^{10}$ of the plate $E^9$ against the frame member $E^4$.

F is an upper section formed as shown in Figure 2 of a generally curved, sheet-like member. It may be rearwardly bent along its upper edge as at $F^1$. At its lower edge it is fastened to an angular frame member $F^2$. Any desired form of upwardly extending end frame members $F^3$ may be used and the section itself is removably fastened to the lower section by a series of bolts $F^4$. $F^3$ preferably overlies the side member $E^5$, as shown in Figure 2.

It will be realized that whereas we have herewith shown and described a practical operative device, nevertheless many changes might be made in the size, shape, number and disposition of parts without departing from the spirit of our invention and we wish, therefore, that our showing be taken as in a sense diagrammatic.

The use and operation of the invention are as follows:

The apparatus may be mounted on any desired form of vehicle. Ordinarily it is mounted on an automotive vehicle but that is not necessary. Whatever the vehicle, the main frame of the assembly is attached to the forward end of the vehicle and thereafter, during the time that it remains upon the vehicle, it is fixed and the frame thus becomes in effect an extension of the main frame of the vehicle itself and it provides a support for the movable parts of the tool assembly. The height of the blade or other implement itself above the road surface is determined by the position of the piston in the pressure cylinder. This pressure cylinder may be of any desired type and may be connected with any suitable source or pressure fluid. Since it rests upon the fixed frame and since the chains which it carries are attached to the lifting and swinging arms which themselves carry the blade, the latter and the arms which carry it are raised and lowered by raising and lowering the piston. As a matter of convenience the locking ring $D^7$ is provided so that once the piston has been moved to its desired height by pressure it may be locked in that position and the pressure may be relaxed. Of course, the locking ring might be omitted and the pressure retained. Also, instead of a pressure cylinder the piston might be raised by any other desired means, such as a screw or lever mechanism, but whatever the details of this construction, means are provided, resting upon the fixed frame, for raising and lowering the swinging arms.

When the swinging arms D, D, have been raised to the desired height so that the blade or other road implement is properly adjusted with respect to the road surface, the angle of the blade with respect to the line of travel may be adjusted. The blade itself is carried movably upon the two pins $D^{17}$ which are mounted one at the end of each of the arms D. When the parts are in the position shown in Figure 1, the blade is arranged at right angles to the line of travel of the vehicle and the latch pins $B^{17}$ are in position in the holes $C^5$ of the rods $C^4$ so that the ends of the arms D are held in position. The latch pins $D^{11}$ are also engaged in the central holes $E^2$ of the plate sections $E^1$ so that the parts are all rigidly held in the position shown in Figure 1.

If now it is desired to adjust the angular position of the blade from that shown in Figure 1 to that shown in Figure 5, all of the latch pins are withdrawn and the parts are then pushed or otherwise moved into the position shown in Figure 5. The latch pins $B^{17}$ and $D^{11}$ are then released and are forced into different holes $C^6$ and $E^2$ in the plate sections C and $E^1$ and the blade as a whole and the plate E with the plate sections $E^1$ are all locked again with respect to the arms D, D so that they cannot swing or tilt with respect to them. The blade is thus locked in position at the desired angular adjustment.

By this construction it is clear that the blade may be raised and lowered with respect to the road surface to almost any desired position and that its angular adjustment with respect to the line of travel may be varied. Whatever the angular position of adjustment of the blade, the pivot point of the blade carrying arms D always remains at the balls $C^7$ and thus the length of the arms D is constant no matter what the position of angular adjustment, and if the blade has been moved, for example to the position shown in Figure 5 and it is desired then to raise it, a raising of the piston $D^5$ will raise the blade and since the lever arms D, which carry the blade, are of constant length, the blade will rise and will remain parallel to the road surface. Thus, by the construction shown, adjustment with respect to the road surface and angular adjustment are possible and no matter what the angular adjustment, any adjustment with respect to the road surface always leaves the lower edge of the blade parallel to the road surface. This is a point of great importance because it permits accurate and uniform adjustment of the blade with respect to the road surface, no matter what the angular adjustment of the blade with respect to the line of travel.

We claim:

1. In combination with a road vehicle, a road implement assembly comprising a plurality of arms supported at their rear ends upon and projecting forwardly of said vehicle and adapted to be raised and lowered, the arms arranged at their forward ends to receive and support a road implement, the arms being supported at their rear ends in shiftable bearings, the effective lever length of said arms remaining the same, irrespective of the position of their bearings.

2. In combination with a road vehicle, a road implement assembly comprising a plurality of arms supported at their rear ends upon and projecting forwardly of said vehicle and adapted to be raised and lowered, and means for raising and lowering them, the arms arranged at their forward ends to receive and support a road implement, the arms being supported at their rear ends in shiftable bearings, the effective lever length of said arms remaining the same irrespective of the position of their bearings.

3. In combination with a road vehicle, a road implement assembly comprising a plurality of arms supported at their rear ends upon and projecting forwardly of said vehicle and adapted to be raised and lowered, the arms arranged at their forward ends to receive and support a road implement, and arms being of identical length and being supported at their rear ends in shiftable ball and socket bearings, the effective lever length of said arms remaining the same, irrespective of the position of their bearings.

4. In combination with a road vehicle, a road implement assembly comprising a plurality of arms supported at their rear ends upon and projecting forwardly of said vehicle and adapted to be raised and lowered and means for raising and lowering them, the arms arranged at their forward ends to receive and support a road implement, the arms being of identical length and being supported at their rear ends in shiftable ball and socket bearings, the effective lever length of said arms remaining the same, irrespective of the position of their bearings.

5. In combination with an automotive truck, a separate and self contained road implement assembly, comprising a supporting frame and means for removably attaching it to a vehicle frame, and a moving frame movably mounted upon said supporting frame, said moving frame including a yoke, a pair of implement-carrying arms pivoted upon said yoke for movement with respect thereto, there being an implement mounted upon said arms, and means on the supporting frame for raising and lowering said arms, means for locking the yoke in adjusted position and additional means on said arms for locking the implement in adjusted position with respect to said arms.

6. In combination with an automotive truck, a separate and self contained road implement assembly, comprising a supporting frame and means for removably attaching it to a vehicle frame, and a moving frame movably mounted upon said supporting frame, said moving frame including a yoke, a pair of implement-carrying arms pivoted upon said yoke for universal movement with respect thereto, there being an implement mounted upon said arms, and means on the supporting frame for raising and lowering said arms, means for locking the yoke in adjusted position and additional means on said arms for locking the implement in adjusted position with respect to said arms.

7. In combination with an automotive truck, a separate and self contained road implement assembly, comprising a supporting frame and means for removably attaching it to a vehicle frame, and a moving frame movably mounted upon said supporting frame, said moving frame including a yoke, a pair of implement carrying arms pivoted upon said yoke for movement with respect thereto, there being an implement mounted upon said arms for swinging movement with respect thereto and means on the supporting frame for raising and lowering said arms, means for locking the yoke in adjusted position and additional means for locking the implement to said arms in adjusted position with respect to said arms.

8. In combination with an automotive truck, a separate and self contained road implement assembly, comprising a supporting frame and means for removably attaching it to a vehicle frame, and a moving frame movably mounted upon said supporting frame, said moving frame including a yoke, a pair of implement carrying arms pivoted upon said yoke for universal movement with respect thereto, there being an implement mounted upon said arms for swinging movement with respect thereto and means on the supporting frame for raising and lowering said arms, means for locking the yoke in adjusted position, and additional means for locking the implement to said arms in adjusted position with respect to said arms.

9. In combination in an accessory road implement assembly adapted for mounting upon wheeled vehicles, a road implement and a movable support therefor, said support provided with means for engagement to a vehicle, means mounted on said support for varying the angular position of the road implement with respect to the said support, and means for raising and lowering the road implement, said angle varying and raising and lowering means comprising a pair of arms and means for raising and lowering them, said arms supported at their rear ends upon said support and projecting forwardly therefrom, said arms engaging and supporting said implement, and a yoke pivotally mounted on said support, said yoke carrying the inner ends of each of said arms, the attaching means whereby said support is attached to a vehicle being so shaped and proportioned that the center line of the implement assembly coincides with the longitudinal axis of the vehicle.

10. In combination with a motor vehicle having a frame, a road implement assembly comprising a sub-frame separate from and removably positioned on the vehicle, a yoke supported on said sub-frame and mounted on the center line of the vehicle and the sub-frame for pivotal movement in a generally horizontal plane, means for locking the yoke against movement, a pair of implement carrying and supporting arms projecting forwardly from said sub-frame, of the same length and pivoted one at each end of said yoke, said arms constituting the sole support of said implement, an implement symmetrically pivoted at the outer ends of said arms, means for locking the implement in adjusted angular position with respect to said arms, and means for raising and lowering said arms and with them the implement, comprising a hydraulic cylinder positioned between said arms and provided with a member engaging each of said arms.

11. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement.

12. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement, said arms and yoke comprising means for angularly adjusting said implement with respect to the main longitudinal axis of said implement assembly.

13. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement, said sub-frame provided with latches and said yoke provided with latch-engaging portions, whereby the yoke may be secured in adjusted position with respect to said sub-frame.

14. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement, said road implement provided on its rear with an extension carrying latch-engaging parts, latches positioned one on each of said forwardly extending arms, to engage the latch-engaging parts of said extension to lock the implement in adjusted position with respect to said arms.

15. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement, said sub-frame provided with latches and said yoke provided with latch-engaging portions, whereby the yoke may be secured in adjusted position with respect to said sub-frame, said road implement provided on its rear with an extension carrying latch-engaging parts, latches positioned one on each of said forwardly extending arms, to engage the latch-engaging parts of said extension to lock the implement in adjusted position with respect to said arms.

16. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement, said sub-frame provided with latches and said yoke provided with latch-engaging portions, whereby the yoke may be secured in adjusted position with respect to said sub-frame, said arms and yoke comprising means for angularly adjusting said implement with respect to the main longitudinal axis of said implement assembly.

17. In combination in a road implement assembly suitable for mounting on the forward end of a vehicle, a sub-frame, means on said sub-frame for engaging said vehicle, a yoke pivoted on said sub-frame, a pair of arms pivoted at their rear ends on said yoke and projecting forwardly therefrom, a road implement pivoted on the forward ends of said arms, means for raising and lowering said arms and with them said implement, said sub-frame provided with latches and said yoke provided with latch-engaging portions, whereby the yoke may be secured in adjusted position with respect to said sub-frame, said road implement provided on its rear with an extension carrying latch-engaging parts, latches positioned one on each of said forwardly extending arms, to engage the latch-engaging parts of said extension to lock the implement in adjusted position with respect to said arms, said arms and yoke comprising means for angularly adjusting said implement with respect to the main longitudinal axis of said implement assembly.

18. In combination in a road implement assembly suitable for mounting on the forward end of a vehicle frame, a sub-frame, means on said sub-frame for engaging said vehicle frame, a yoke pivoted on said sub-frame, for generally horizontal movement, a pair of arms pivoted at their rear ends on said yoke and projecting forwardly therefrom, a road implement pivoted on the forward ends of said arms, means for raising and lowering said arms and with them said implement, said arms and yoke comprising means for angularly adjusting said implement with respect to the main longitudinal axis of said implement, said raising and lowering means comprising a hydraulic mechanism positioned upon said sub-frame, connections mounted to be raised and lowered by said hydraulic mechanism and secured at their lower ends to said arms, said sub-frame provided with latches and said yoke provided with latch-engaging portions, whereby the yoke may be secured in adjusted position with respect to said sub-frame, said road implement provided on its rear with an extension carrying latch-engaging parts, latches positioned one on each of said forwardly extending arms, to engage the latch-engaging parts of said extension to lock the implement in adjusted position with respect to said arms.

WILLIAM C. ANTHONY.
LESTER WACHTER.